(12) United States Patent
Cromer et al.

(10) Patent No.: US 6,370,650 B1
(45) Date of Patent: *Apr. 9, 2002

(54) METHOD AND SYSTEM IN A DATA PROCESSING SYSTEM FOR DEACTIVATING A PASSWORD REQUIREMENT UTILIZING A WIRELESS SIGNAL

(75) Inventors: Daryl Carvis Cromer, Cary; Richard Alan Dayan, Wake Forest; Howard Locker; Michael Steinmetz, both of Cary; James Peter Ward, Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/169,287

(22) Filed: Oct. 8, 1998

(51) Int. Cl.[7] .................................................. H04L 9/32
(52) U.S. Cl. ...................................... 713/202; 340/5.61
(58) Field of Search .............................. 713/200, 201, 713/202, 1, 2, 300, 310; 235/380, 382; 340/5.1, 5.2, 5.21, 5.61, 5.62

(56) References Cited

U.S. PATENT DOCUMENTS 5,574,786 A * 11/1996 Dayan et al. ................... 380/4
5,760,701 A *  6/1998 Mitsumoto ................. 340/5.72
5,960,085 A *  9/1999 De La Huerga .............. 380/25
5,974,500 A * 10/1999 Maletsky et al. ........... 711/103

* cited by examiner

Primary Examiner—Gail Hayes
Assistant Examiner—Christopher Revak
(74) Attorney, Agent, or Firm—George E. Grosser; Andrew Dillon

(57) ABSTRACT

A method and system are described for deactivating a password requirement in a computer system included within a data processing system. The computer system requires the entry of a password in order to operate the computer system. A wireless signal is transmitted to the computer system such that computer system receives the signal. In response to a receipt of the wireless signal, the requirement that a password be entered is temporarily deactivated. The computer system is thus operable without the entry of the password.

12 Claims, 4 Drawing Sheets

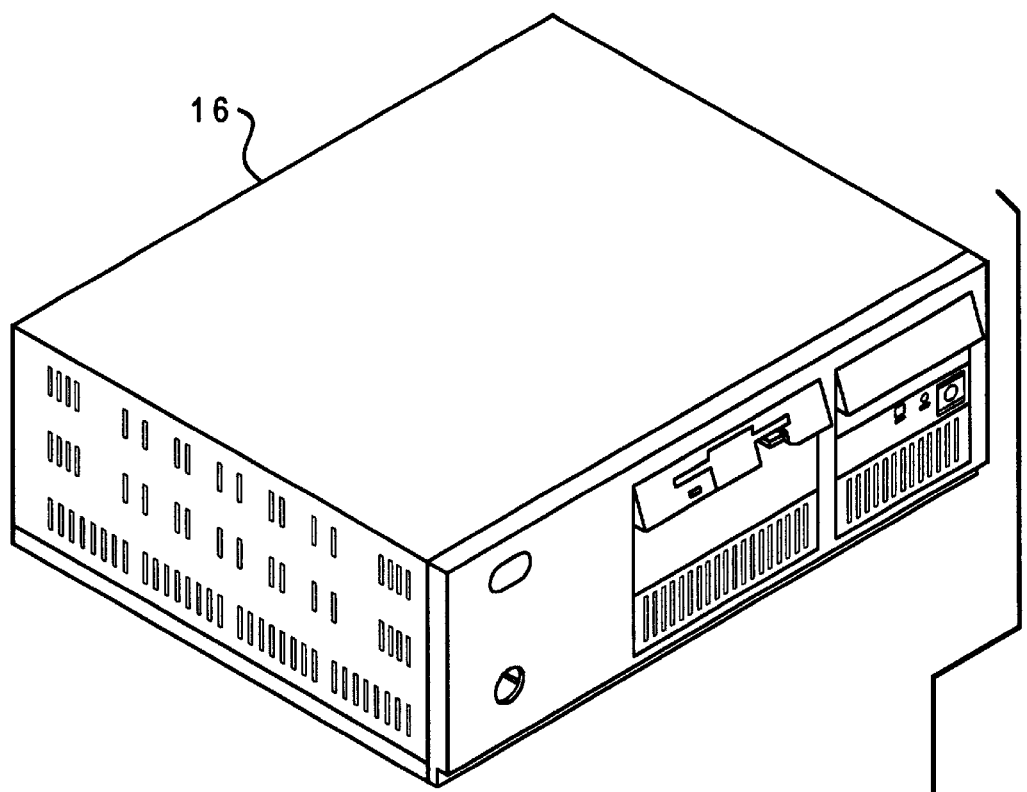
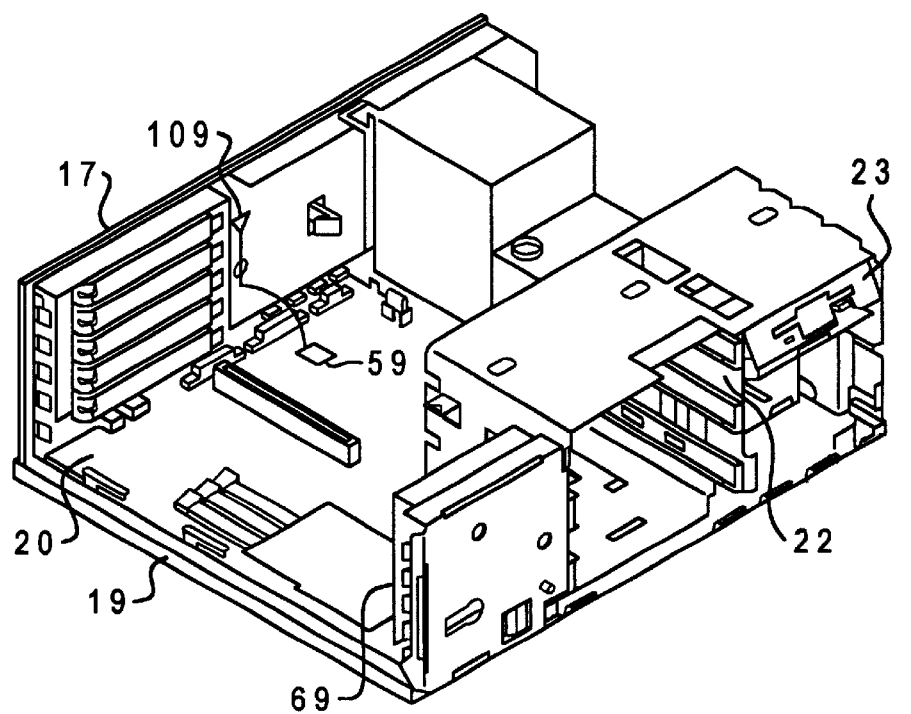
Fig. 2

METHOD AND SYSTEM IN A DATA PROCESSING SYSTEM FOR DEACTIVATING A PASSWORD REQUIREMENT UTILIZING A WIRELESS SIGNAL

CROSS-REFERENCE TO RELATED APPLICATIONS

The present invention is related to the subject matter of co-pending patent application Ser. No. 08/971,117 entitled "Programmable Access Protection In Memory Device" assigned to the assignee herein named filed on Nov. 14, 1997 and incorporated herein by reference.

BACKGROUND OF THE INVENTION

1. Field of the Invention

The present invention relates in general to data processing systems and, in particular, to a data processing system, which requires entry of a password to be operable, capable of receiving a wireless signal which deactivates the password requirement. Still more particularly, the present invention relates to a method and system in a data processing system for providing an override indicator within the data processing system, which deactivates a password requirement where the override indicator is set in response to a receipt of a wireless signal.

2. Description of the Related Art

Personal computer systems have attained widespread use for providing computing power to many segments of today's modern society. Personal computer systems can usually be defined as a desk top, floor standing, or portable that consists of a system unit having at least one system processor and associated volatile and non-volatile memory, a display monitor, a keyboard, one or more diskette drives, a fixed disk storage, and an optional printer. One of the distinguishing characteristics of these systems is the use of a motherboard (also known as and occasionally mentioned herein as a system board, system planar, or planar) to electronically connect these components together. These systems are designed primarily to give independent computing power to a single user and are inexpensively priced for purchase by individuals or small businesses. Examples of such personal computer systems are IBM's IntelliStation and IBM's PC 300 PL and PC 300 GL.

Theft and unauthorized use of computer systems are both large problems which can result in lost data and significant costs to businesses. Many known systems exist to protect against these losses.

Computer systems may be protected against unauthorized use by the requirement of the correct entry of a password. Some systems are inoperable without first correctly entering the password. In other systems, a user may access a limited number of functions of the systems while other functions remain unaccessible without the correct entry of the password.

A problem can arise when a protected computer system must be serviced. In order to service the computer system, the service technician must be able to analyze the operations of the computer system. Therefore, the computer system must be operable. A common method for permitting service is to provide the service technician with the password. However, as the number of people who have access the password increases, the possibility that the password is compromised and is no longer secure also increases.

For businesses with a large number of computer systems to be serviced, the task of maintaining the passwords for each system becomes more difficult. In addition, passwords tend to be forgotten or lost. When this happens, the service technician must contact the computer system owner for the password. Typically, the technician cannot identify the owner and must contact the service supervisor who then must contact the owner. This is very time consuming which delays the repair of the system, and also results in further dissemination of the password.

Some systems permit the deactivation of the password requirement for future use of the system. However, in order to deactivate the password for future operation of the computer system, the password must first be entered into the computer system. The requirement of entry of the password is then deactivated.

Therefore a need exists for a method and system in a data processing system for deactivating a password requirement utilizing a wireless signal transmitted by a transmitter operated by a user who does not know the password.

SUMMARY OF THE INVENTION

It is therefore one object of the present invention to provide an improved data processing system.

It is another object of the present invention to provide a method and system in a data processing system which requires entry of a password to be operable for receiving a wireless signal which deactivates the password requirement without requiring power being applied to the system.

It is yet another object of the present invention to provide a method and system in a data processing system for providing an override indicator within the data processing system which deactivates a password requirement where the override indicator is set in response to a receipt of a is wireless signal.

The foregoing objects are achieved as is now described. A method and system are described for deactivating a password requirement in a computer system included within a data processing system. The computer system requires the entry of a password in order to operate the computer system. A wireless signal is transmitted to the computer system such that computer system receives the signal. In response to a receipt of the wireless signal, the requirement that a password be entered is temporarily deactivated. The computer system is thus operable without the entry of the password.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

FIG. 2 depicts a pictorial representation of an exploded view of computer 12 in accordance with the method and system of the present invention;

DESCRIPTION OF A PREFERRED EMBODIMENT

Figure 1:
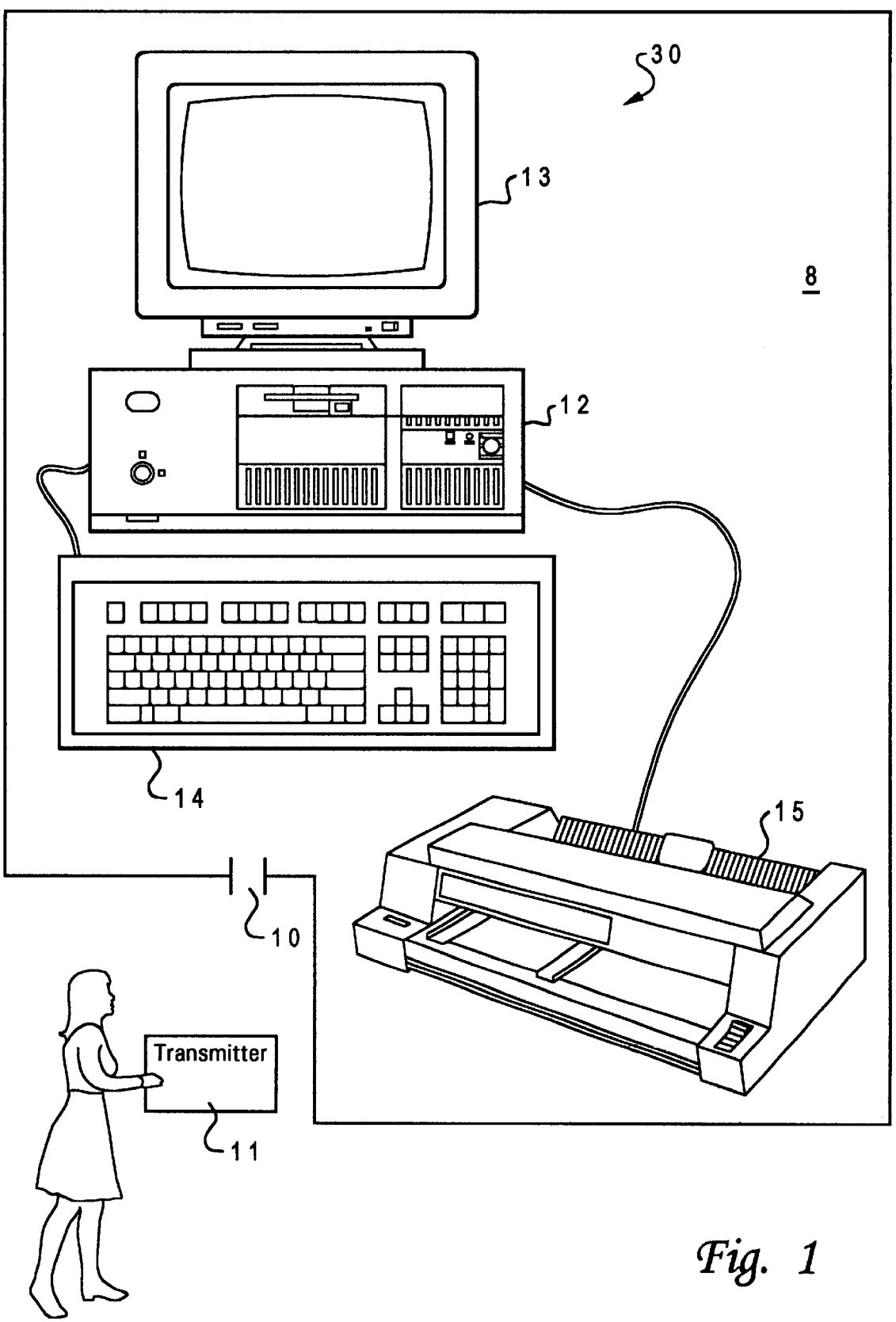
FIG. 1 illustrates a pictorial representation of a computer system and a transmitter for transmitting a wireless signal to deactivate a password requirement in accordance with the method and system of the present invention.

A preferred embodiment of the present invention and its advantages are better understood by referring to FIGS. 1–4 of the drawings, like numerals being used for like and corresponding parts of the accompanying drawings.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts and not as limiting upon the present invention.

The present invention is a method and system for temporarily deactivating a password requirement in a computer system without entering the password. In this manner, the password requirement can be deactivated by a user, such as a service technician, without the user knowing the password.

The computer system normally requires the password in order to be operable. A wireless signal is transmitted to the computer system utilizing a transmitter. In response to a receipt of the wireless signal by the computer system, the requirement of entering the password is deactivated. The deactivation of the password requirement is processed without the need to power on the system. The computer system is then operable without the entry of the password.

Preferably, the computer system is associated with a physical region where the computer system is located. When the computer system is removed from the physical region, a tamper bit is set. The tamper bit is a first indicator within the computer system which indicates that the computer system has be removed from its physical location.

When the tamper bit is set, the computer system is inoperable without the correct entry of a password. When the password is correctly entered, the computer system becomes operable again.

The present invention describes an override indicator, also included within the computer system, which when set indicates that the status of the tamper bit is to be ignored. Therefore, when the override indicator is set, the computer system remains operable even if the computer system has been removed from its physical region causing the setting of the tamper bit.

The override indicator is set utilizing a transmitter device. The transmitter device is capable of transmitting wireless signals, i.e. radio frequency signals. The transmitter device transmits a wireless signal having a specified form in order to set the override indicator. A computer system which includes an override indicator and which is in the vicinity of the transmitter device and receives the specified signal will have the override indicator set. In this manner, a user who operates the transmitter device may cause the deactivation of the password requirement without ever entering the password into the system.

FIG. 1 illustrates a pictorial representation of a computer system and a transmitter for transmitting a wireless signal to deactivate a password requirement in accordance with the method and system of the present invention. Computer system 30 includes a computer 12, a monitor 13, a keyboard 14, and a printer or plotter 15.

In a preferred embodiment, computer system 30 is associated with a physical region 8 within which it is located. When computer system 30 is removed from physical region 8 through a portal 10, a tamper bit 70 (shown in FIG. 3) within computer system 30 is set. When tamper bit 70 is set, computer system 30 will not operate unless a password is correctly entered.

A user may override, or deactivate, the requirement that the password be correctly entered by utilizing transmitter device 11 to transmit a wireless signal to computer system 30. Transmitter device 11 is preferably capable of transmitting an appropriately modulated radio signal of specified frequency which incorporates the desired information to be transmitted. Those skilled in the art will recognize that any transmitter device suitably configured to transmit such a signal may be utilized. Those skilled in the art will also recognize that the frequency and power requirements are determined according to the requirements of the receiver. Therefore, if a receiver is utilized which requires a signal having a different frequency and/or power range, a suitable transmitter device may be selected using those frequency and power requirements.

When computer system 30 receives a wireless signal transmitted by transmitter device 11, an override indicator 72 (shown in FIG. 3) is set. When override indicator 72 is set, the status of tamper bit 70 is ignored. In this manner, computer system 30 may be operated even though tamper bit 70 is set. Computer system 30 will operate even though the password is not entered.

FIG. 2 depicts a pictorial representation of an exploded view of computer 12 in accordance with the method and system of the present invention. Computer 12 has a cover 16 which cooperates with a chassis 19 in defining an enclosed shielded volume for receiving data processing and storage components for processing and storing digital data. At least certain of the system components are mounted on a multi-layer planar 20 (also commonly called a motherboard or system board) which is mounted on the chassis 19 and provides a means for mounting and electrically interconnecting various components of computer 12 including the CPU, system memory, and accessory cards or boards as is well known in the art.

Chassis 19 has a base and a rear panel 17 and defines at least one open bay 22 for receiving a data storage device such as a disk drive 23. An antenna 109 is mounted to extend outside computer 12 to collect radiation having a predefined characteristic. Antenna 109 is intended to provide a signal to system 30 indicating radiation having the predefined characteristic in the vicinity of computer system 30.

Figure 3:
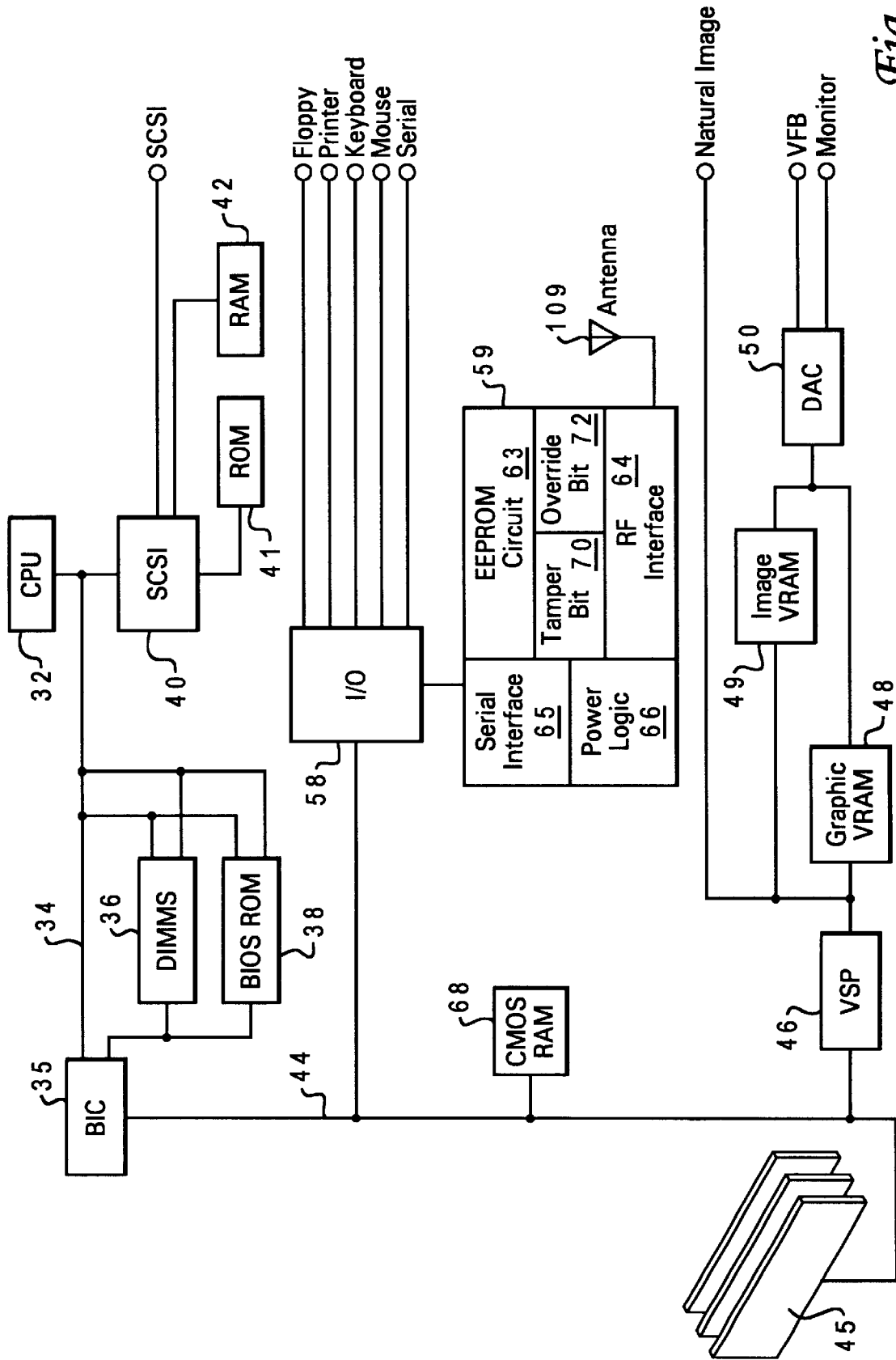
FIG. 3 illustrates a high level block diagram of computer system 30 illustrating the various components of computer system 30 in accordance with the method and system of the present invention.

FIG. 3 illustrates a high level block diagram of computer system 30 illustrating the various components of computer system 30 in accordance with the method and system of the present invention, including components mounted on the planar 20 and the connection of the planar to the I/O slots and other hardware of the personal computer system. Connected to the planar is the system processor 32. While any appropriate microprocessor can be used as the CPU 32, one suitable microprocessor is the Pentium which is sold by INTEL. The CPU 32 is connected by a high speed CPU local bus 34 to a bus interface control unit 35, volatile random access memory (RAM) 36 here shown as Dual Inline Memory Modules (DIMMS), and t o BIOS ROM 38 in which is stored instructions for basic input/output operations to the CPU 32. The BIOS ROM 38 includes the BIOS that is used to interface between the I/O devices and the operating system of the microprocessor 32. Instructions stored in the BIOS ROM 38 can be copied into RAM 36 to decrease the execution time of BIOS. The system also has, as has become conventional, a circuit component which has battery backed non-volatile memory 68 (conventionally CMOS RAM) for receiving and retaining data regarding the system configuration and a real time clock (RTC).

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel Pentium or Pentium II microprocessor.

Returning again to FIG. 3, the CPU local bus 34 (comprising data, address, and control components) also provides for the connection of the microprocessor 32 with a Small Computer Systems Interface (SCSI) controller 40. The SCSI controller 40 may, as is known to persons skilled in the arts of computer design and operation, be connected or connectable with Read Only Memory (ROM) 41, RAM 42, and suitable internal or external devices of a variety of types as facilitated by the I/O connection indicated to the right in the Figure. The SCSI controller 40 functions as a storage controller in controlling storage memory devices such as fixed or removable media electromagnetic storage devices (also known as hard and floppy disk drives), electro-optical, tape and other storage devices.

Bus interface controller (BIC) 35 couples CPU local bus 34 with an I/O bus 44. By means of bus 44, BIC 35 is coupled with an optional feature bus such as a PCI bus having a plurality of I/O slots for receiving PCI adapter cards 45 which may be further connected to an I/O device or memory (not shown). The I/O bus 44 includes address, data, and control components.

Coupled along I/O bus 44 are a variety of I/O components such as a video signal processor 46 which is associated with video RAM (VRAM) for storing graphic information 48 and for storing image information 49. Video signals exchanged with the processor 46 may be passed through a Digital to Analog Converter (DAC) 50 to a monitor or other display device. Provision is also made for connecting the VSP 46 directly with what is here referred to as a natural image input/output, which may take the form of a video recorder/player, camera, etc.

The I/O bus 44 is coupled utilizing an input/output controller 58 to an associated Electrical Erasable Programmable Read Only Memory (EEPROM) 59. Conventional peripherals, such as floppy disk drives, a printer or plotter 15, keyboard 14 and a mouse or pointing device (not shown), are coupled to I/O bus 44 utilizing I/O controller 58.

EEPROM 59 includes an EEPROM circuit 63, a serial interface 65 for inputting and outputting signals, a radio frequency (RF) interface 64 for receiving wireless signals, a power management logic circuit 66, a tamper bit 70, and an override bit 72.

Tamper bit 70 is utilized as a first indicator to indicate a removal of computer system 30 from its associated physical region. When tamper bit 70 is set, computer system 30 will not operate without the correct entry of the privileged access password (PAP). When the PAP is entered, computer system 30 will operate normally. The PAP is described fully in U.S. Pat. No. 5,388,156 issued on Feb. 7, 1995. which is incorporated herein by reference.

Override bit 72 is utilized as an override indicator to indicate that the setting of the tamper bit 70 should be ignored. In this manner, even if tamper bit 70 is set, computer system 30 will operate normally without an entry of the PAP.

Figure 4:
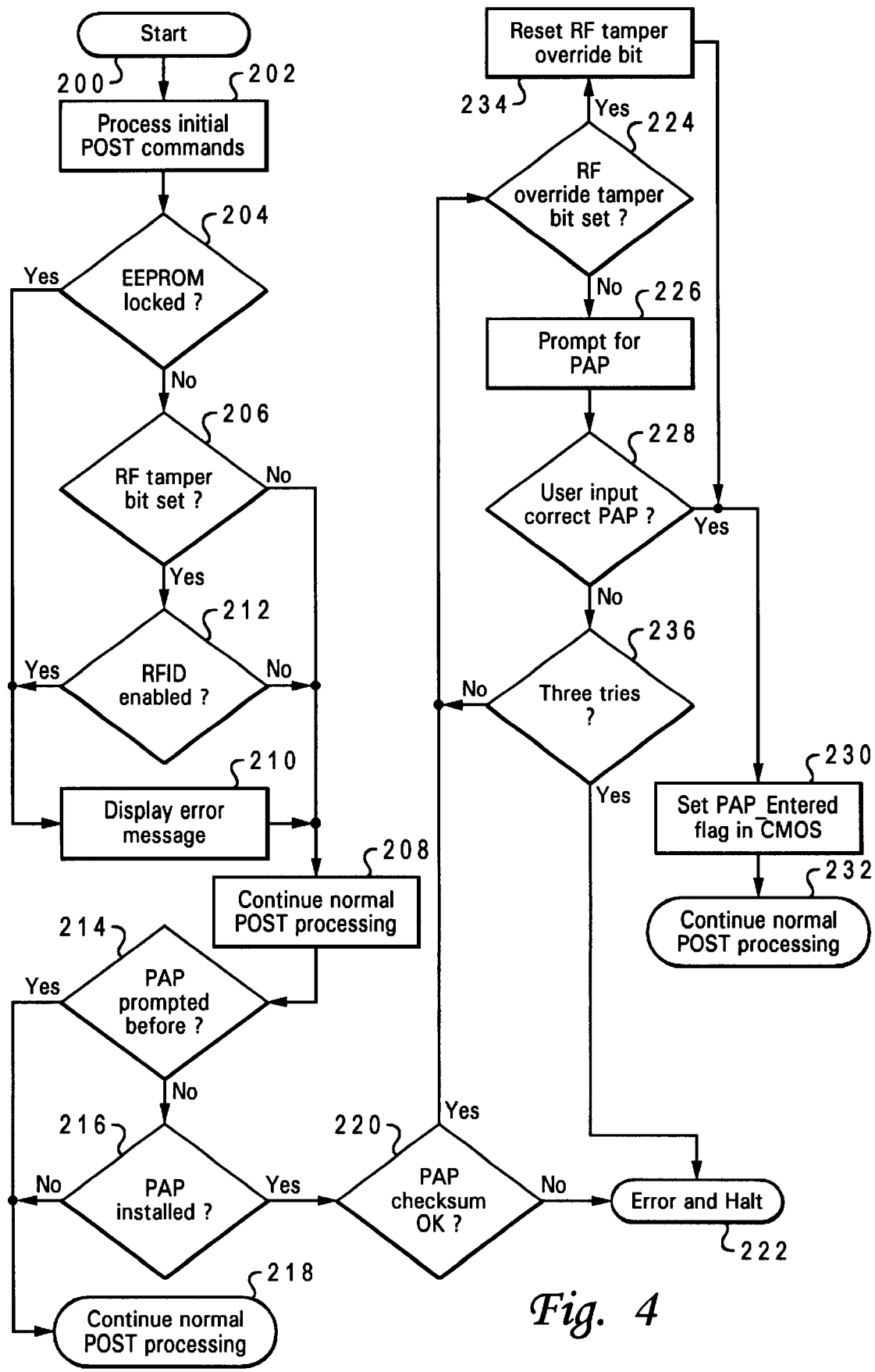
FIG. 4 depicts a high level flow chart which illustrates a sequence of instructions a computer system executes during a power-on condition, and the operation of an override indicator in accordance with the method and system of the present invention.

FIG. 4 depicts a high level flow chart which illustrates a sequence of instructions a computer system executes during a power-on condition, and the operation of an override indicator in accordance with the method and system of the present invention. The process starts as depicted by block 200 and thereafter passes to block 202 which illustrates the processing of initial power-on-self-test (POST) commands. Next, block 204 illustrates a determination of whether or not EEPROM 59 is locked. During normal operation of computer system 30, EEPROM 59 is locked. However, during a period of time during which POST is executed, EEPROM 59 is unlocked. If a determination is made that EEPROM 59 is unlocked, the process passes to block 206 which depicts a determination of whether or not the RF tamper bit is set. The RF tamper bit is an indicator that the computer system in which the tamper bit is set will require the entry of a password in order for the computer system to be operable. If a determination is made that the RF tamper bit is not set, the process passes to block 208 which illustrates the continued execution of normal POST commands. Thereafter, the process passes to block 214.

Referring again to block 204, if a determination is made that EEPROM 59 is locked, the process passes to block 210 which depicts the displaying of an error. Thereafter, the process passes to block 208. Referring again to block 206, if a determination is made that the RF tamper bit is set, the process passes to block 212 which illustrates a determination of whether or not RF interface 64 of EEPROM 59 is enabled to operate. If a determination is made that RF interface 64 of EEPROM 59 is not enabled, the process passes back to block 208. Referring again to block 212, if a determination is made that RF interface 64 is enabled, the process passes to block 210.

Block 214 illustrates a determination of whether or not a user has already been prompted to enter a privileged access password (PAP). Knowledge of the privileged access password is required in order to be able to perform predefined operations within the computer system. For example, in order to alter the boot sequence, the user must first enter the PAP. For the present invention, the PAP must be entered in order for the computer system to function once the system has been tampered with if the override indicator is not set.

If a determination is made that a user has not already been prompted to enter the PAP, the process passes to block 216 which depicts a determination of whether or not the PAP has already been installed. If a determination is made that the PAP has not been installed, the process passes to block 218 which illustrates normal POST processing continuing. Referring again to block 214, if a determination is made that a user has already been prompted to enter the PAP, the process passes to block 218.

Referring again to block 216, if a determination is made that the PAP has been installed, the process passes to block 220 which illustrates a determination of whether or not the installed PAP is valid by determining whether the PAP checksum is good. If a determination is made that the installed PAP has been corrupted, the process passes to block 222 which depicts displaying an error and halting the process.

Referring again to block 220, if a determination is made that the installed PAP is good, the process passes to block 224 which illustrates a determination of whether or not the RF override indicator, i.e. the override tamper bit, is set. When this bit is set, the computer system will not require the entry of the PAP even though the system has been removed from its physical location causing the RF tamper bit 70 to be set. When this bit is reset, the computer system will not operate if it has been removed from its physical location without a correct entry of the PAP. If a determination is made that the RF override tamper bit is not set, the process passes to block 226 which depicts the prompting of a user to enter the PAP.

Thereafter, the process passes to block 228 which illustrates a determination of whether or not the user has correctly input the PAP. If a determination is made that the user has correctly input the PAP, the process passes to block 230 which depicts the setting of the PAP_Entered flag in CMOS which indicates that the PAP has been correctly entered. Normal POST processing then continues as illustrated by block 232.

Referring again to block 224, if a determination is made that the RF override bit is set, the process passes to block 234 which depicts the resetting of the override bit. In this manner, the override bit is not permanently set. The process then passes to block 230, thus bypassing the requirement that the PAP be entered.

Referring again to block 228, if a determination is made that the user did not correctly enter the PAP, the process passes to block 236 which illustrates a determination of whether or not this is the third attempt to enter the PAP. If a determination is made that this is not the third attempt, the process passes back to block 224 to permit another attempt to correctly enter the PAP. Referring again to block 236, if a determination is made that this is the third attempt, the process passes to block 222 and halts.

While a preferred embodiment has been particularly shown and described, it will be understood by those skilled in the art that various changes in form and detail may be made therein without departing from the spirit and scope of the present invention.

What is claimed is:

1. A method in a data processing system including a computer system requiring entry of a password in order to operate said computer system, said method comprising the steps of:
   transmitting a wireless signal to said computer system, wherein said computer system receives said wireless signal while in a powered-off state; and
   in response to a receipt of said wireless signal, temporarily deactivating said requirement of entry of said password, wherein said computer system is operable without an entry of said password.

2. The method according to claim 1, further comprising the step of transmitting a wireless signal utilizing a transmitter device, said transmitter device being operable by a person who does not know said password to transmit said wireless signal, wherein said password requirement is deactivated by a user who does not know said password.

3. The method according to claim 2, further comprising the steps of:
   associating said computer system with a physical region, said computer system being located within said physical region; and
   upon a removal of said computer system from said physical region, requiring an entry of said password in order to operate said computer system.

4. The method according to claim 3, wherein said step of removing said computer system from said physical region further includes the step of setting a first indicator within said computer system which requires an entry of said password in order to operate said computer system.

5. The method according to claim 4, wherein said step of transmitting a wireless signal further includes the step of transmitting an override indicator to said computer system which stores said override indicator, said override indicator causing said computer system to ignore said first indicator, wherein said computer system operates without entry of said password.

6. The method according to claim 5, further comprising the step of resetting said override indicator in response to said computer system being cycled from a powered-off state to a powered-on state.

7. A data processing system including a computer system requiring entry of a password in order to operate said computer system, comprising:
   means for transmitting a wireless signal to said computer system, wherein said computer system receives said wireless signal while in powered-off state; and
   means responsive to a receipt of said wireless signal, for temporarily deactivating said requirement of entry of said password, wherein said computer system is operable without an entry of said password.

8. The system according to claim 7, further comprising means for transmitting a wireless signal utilizing a transmitter device, said transmitter device being operable by a person who does not know said password to transmit said wireless signal, wherein said password requirement is deactivated by a user who does not know said password.

9. The system according to claim 8, further comprising:
   means for associating said computer system with a physical region, said computer system being located within said physical region; and
   means for upon a removal of said computer system from said physical region, requiring an entry of said password in order to operate said computer system.

10. The system according to claim 9, wherein said means for removing said computer system from said physical region further includes means for setting a first indicator within said computer system which requires an entry of said password in order to operate said computer system.

11. The system according to claim 10, wherein said means for transmitting a wireless signal further includes means for transmitting an override indicator to said computer system which stores said override indicator, said override indicator causing said computer system to ignore said first indicator, wherein said computer system operates without entry of said password.

12. The system according to claim 11, further comprising means for resetting said override indicator in response to said computer system being cycled from a powered-off state to a powered-on state.

* * * * *